US005739529A

United States Patent [19]

Laukien et al.

[11] Patent Number: 5,739,529

[45] Date of Patent: Apr. 14, 1998

[54] DEVICE AND METHOD FOR THE IMPROVED MASS RESOLUTION OF TIME-OF-FLIGHT MASS SPECTROMETER WITH ION REFLECTOR

[75] Inventors: Frank Laukien, Lincoln, Mass.; Jürgen Grotemeyer, Kirchheim, Germany; Johann Grundwürmer, Neuötting, Germany; Claus Köster, Lilienthal, Germany

[73] Assignee: Bruker-Franzen Analytik GmbH, Bremen, Germany

[21] Appl. No.: 783,482

[22] Filed: Jan. 14, 1997

Related U.S. Application Data

[63] Continuation of Ser. No. 563,962, Nov. 29, 1995, abandoned.

[30] Foreign Application Priority Data

Nov. 29, 1994 [DE] Germany .......................... 44 42 348.9

[51] Int. Cl.[6] ............................ B01D 59/44; H01J 49/00

[52] U.S. Cl. ........................................... 250/287; 250/282

[58] Field of Search .................................... 250/282, 281, 250/287

[56] References Cited

U.S. PATENT DOCUMENTS

| | | | |
|---|---|---|---|
| 3,727,047 | 4/1973 | Janes | 250/287 |
| 4,072,862 | 2/1978 | Mamyrin et al. | 250/287 |
| 4,458,149 | 7/1984 | Muga | 250/287 |
| 4,635,112 | 1/1987 | Yoshida | 250/287 |
| 4,731,532 | 3/1988 | Frey et al. | 250/287 |
| 5,160,840 | 11/1992 | Vestal | 250/287 |
| 5,300,774 | 4/1994 | Buttrill | 250/287 |

OTHER PUBLICATIONS

Robert J. Cotter, *Time-of-Flight Mass Spectrometry for the Structural Analysis of Biological Molecles*, Analytical Chemistry, vol. 64, No. 21, pp. 1027–1039, Nov. 1, 1992.

George E. Yefchak et al., *Models For Mass-Independent Space and Energy Focusing In Time-Of-Flight Mass Spectrometry*, International Journal of Mass Spectrometry and Ion Processes, vol. 87, pp. 313–330, 1989 no month.

Johann M. Grundwumer et al., *High-resolution mass spectrometry in a linear time-of-flight mass spectrometer*, vol. 131, pp. 139–148, 1994 no month.

*Primary Examiner*—Bruce Anderson

[57] ABSTRACT

In a time-of-flight mass spectrometer with an ion reflector located after the ion source and before the ion detector, to compensate for different starting energies of ions of equal masses, in the ion flight path inside or after the ion reflector at least one electrode is provided for, to which a pulsed high voltage is applied in such a way that within a predetermined narrow range of ion masses, time-of-flight errors for ions of equal masses due to different formation locations or times in the ion source are compensated for at the ion detector. In this way, apart from an energy compensation, also time-of-flight errors of the ions under investigation can simultaneously be compensated for.

21 Claims, 6 Drawing Sheets

DEVICE AND METHOD FOR THE IMPROVED MASS RESOLUTION OF TIME-OF-FLIGHT MASS SPECTROMETER WITH ION REFLECTOR

This is a continuation of application Ser. No. 08/563,962, filed Nov. 29, 1995, abandoned.

BACKGROUND OF THE INVENTION

The invention concerns a time-of-flight mass spectrometer with an ion source, an ion flight path and an ion detector at the end of the ion flight path, wherein in the ion flight path, after the ion source and before the ion detector, an ion reflector is placed to compensate for different starting energies of ions of equal masses. Such a time-of-flight mass spectrometer is known from U.S. Pat. No. 4,731,532.

With all known ionization techniques to mass spectroscopically represent ions, the ions are formed in the ion source with considerable time and energy uncertainty. These uncertainties are intrinsic properties of the ionization procedure and cannot, even with modern laser methods, be minimized to such an extent that improvement of the resolving power would be possible without further mass spectrometric techniques.

Ideally, an ion source should create ions at an infinitely small location and at the same time, i.e. within $10^{-16}$ s. For several reasons, also of technical nature, this is impossible. In certain approaches, this problem can be solved by going over to gaseous sample molecules which are embedded in a supersonic gas jet and using multiphoton ionization to form the ions.

For large molecule ions, formed by means of matrix assisted laser desorption, these two requirements are by no means met. It is true that since the ions quasi start from the surface, both time uncertainty as well as energy uncertainty are halved due to the emission of the ions into a defined half-space, but their absolute value is doubled compared to gaseous samples.

Mass spectrometric techniques, as for example use of an ion reflector inside the time-of-flight mass spectrometer, try to correct both these uncertainties which worsen the mass resolution of the mass spectrometer. Thereby, the ion reflector corrects for all energy errors and for such time-of-flight errors which can be transformed into energy errors. Ions of different starting energies and equal masses, which were created at the same time in the same narrow spatial region, are equalized by time-of-flight differences inside the ion reflector in such a way that they reach the ion detector simultaneously. Pure time errors, originating for example from the finite length of the ionizing pulse in the ion source as well as from the time duration of the ion forming during the desorption process, cannot be corrected for by this ion optical device. These time errors lead therefore to a broadening of the mass signal and thereby to a worsening of the resolution.

In the literature, various other techniques have been discussed, which should increase the time-of-flight mass spectrometer resolution, e.g. the post source pulse focusing method (PSPF), as known for example from the article "High-resolution mass spectrometry in a linear time-of-flight mass spectrometer" by J. M. Grundwuermer et al. in International Journal of Mass Spectrometry and Ion Processes 131 (1994) 139–148. With the PSPF method, which up to now has only been used in linear time-of-flight mass spectrometers, time-of-flight differences of ions of equal masses which were formed at the same location but at different times, are equalized by a linear post-acceleration of the ions, as a rule immediately after the ion source. A following ion reflector would, however, cancel this effect since the time compensation because of the post-acceleration is destroyed again by the energy compensation inside the ion reflector.

For this reason, up to now no reflecting time-of-flight mass spectrometers are known where a PSPF method is incorporated. Therefore, up to now one had to choose between time compensation or energy focusing. It is therefore the object of the present invention to present a reflecting time-of-flight mass spectrometer with energy focusing by an ion reflector, wherein additionally time compensation is possible.

SUMMARY OF THE INVENTION

This object is achieved by the invention in a manner, both simple and effective, in that in the ion flight path inside or after the ion reflector at least one electrode is provided for, to which a pulsed high voltage is applied in such a way that within a predetermined narrow range of ion masses, time-of-flight errors for ions of equal masses due to different locations of formation or formation times in the ion source, are compensated for at the ion detector.

In the suggested configuration, the ions are sent at first through the ion reflector in order to correct energy errors. After reflection at the end electrodes, the ions are post-accelerated by means of a pulsed high voltage potential between at least two electrodes which are arranged either still inside the ion reflector or behind the ion reflector, in such a way that the first ions of equal mass inside a narrow mass window, which had been spatially and temporally separated from the last ions of the same mass of the ion pulse, are more strongly decelerated or less post-accelerated, respectively, whereas the following ions of the same mass experience a lower deceleration or a stronger post-acceleration, respectively.

In this way, the ions arriving first are decelerated relative to the ions arriving last, so that ions of equal masses, at least for a predetermined narrow mass range, arrive simultaneously at the ion detector. In this way, it is achieved to effect energy compensation as well as compensation of time-of-flight errors for ions of equal masses inside an ion cloud.

An embodiment of the time-of-flight mass spectrometer according to the invention is particularly preferred, where the fraction of the ion flight path between ion source and the electrodes with pulsed high voltage is smaller or equal to the fraction of the ion flight path between the electrodes with pulsed high voltage and ion detector. In this way, for the purpose of time compensation, ions of equal masses profit from a remaining flight distance from the pulsed high voltage electrodes to the ion detector which is longer than the flight distance from the ion source to the pulsed electrodes. Thereby, compensation of time-of-flight errors can be realized particularly well by appropriate timing of the high voltage pulses and following compressing of an ion cloud of equal masses caused by the high voltage pulse because of a spatial and temporal contraction of the ion cloud during the longer remaining flight distance.

An embodiment is particularly preferred where the electrodes with pulsed high voltage have a considerably smaller distance to the ion reflector than to the ion detector. This configuration, too, contributes to a better equalizing of ions of equal masses during the remaining flight path and thereby to an improved time compensation.

In a particularly compact embodiment of the time-of-flight mass spectrometer according to the invention, the electrodes with pulsed high voltage are an integral part of the ion reflector. For example, after reflection of the ions of interest, while they leave the reflectron, an appropriately timed high voltage pulse can be applied to the electrodes which are farthest away from the end electrode of the ion reflector. In this way, also, prior art ion reflectors which are already commercially available, can be adapted with little modification such that energy as well as time-of-flight compensation can be incorporated.

In a co-linear embodiment of the time-of-flight mass spectrometer according to the invention the ion flight path inside the ion reflector is retro-reflected and the ion detector is located at the connecting line from ion source to ion reflector. In contrast to the usual bent configurations, such a co-linear set up of the mass spectrometer is spatially particularly compact and space-saving. In addition, in this way a considerably smaller vacuum system is required, since on their way back to the ion detector, the retro-reflected ions move on the same flight path on which they reached the reflector from the ion source. The second arm of a bent reflecting mass spectrometer pointing at the detector can therefore be omitted along with the corresponding additional effort necessary to evacuate this second part of the ion flight path.

In an advantageous improvement of this embodiment, the ion detector is located between ion source and ion reflector at a small distance from the ion source and comprises on its axis a central recess, preferably a circular hole. Such a co-linear configuration can be designed in particularly compact way if the electrode with pulsed high voltage are an integral component of the ion reflector.

In a further preferred embodiment, respectively neighboring electrodes are electrically connected by resistors of a voltage divider which determines the electrode potentials. In this way, the desired pulsed field distribution can be generated particularly easily.

A method of using a time-of-flight mass spectrometer of the above-described kind is also within the scope of the invention, where ions are formed in the ion source, accelerated on the ion flight path and reflected in the ion reflector in such a way that different starting energies of ions of equal masses are compensated for. According to the invention, in this method, time-of-flight errors due to different locations of formation or formation times in the ion source of ions of equal masses are compensated for at the ion detector in a predetermined narrow ion mass range by application of a suitable high voltage to the corresponding electrodes after reflection of the ions in the ion reflector.

In a particularly preferred variant of the method, the pulse slope of the pulsed high voltage is very steep, preferably about 1 kV in 10 ns. In this way, the accelerations or decelerations, respectively, of all ions of equal masses experiencing this field, differ in strength because of their different locations. The sharper the temporal increase of the high voltage pulse can be realized, the more exact the relative timing can be set, and the better time-of-flight errors of ions of equal masses are compensated for during the remaining flight path till the ion detector.

Preferably, the ion masses of the ions investigated are in the order of 100 to 10,000 mass units and the mass window defining the predetermined narrow ion mass range is about 10% of the highest mass unit, preferably 10 mass units or less, wide.

Particularly preferred is a variant of the method, where in a time-of-flight mass spectrometer where the electrodes with pulsed high voltage are an integral component of the ion reflector, the voltage $U_{ref}$ at the ion reflector end electrode is increased or decreased, respectively, by the pulse voltage $U_{pulse}$ during the application of the pulsed high voltage. It is understood that the application of the pulsed high voltage to the ions of interest with equal masses is effected only after reflection away from the ion reflector end electrode.

Further advantages of the invention result from the description and the accompanying drawings. The above-mentioned features and those to be further described below in accordance with the invention can be utilized individually or collectively in arbitrary combination. The embodiments shown and described are not to be considered as an exhaustive enumeration but, rather, have exemplary character only.

BRIEF DESCRIPTION OF THE DRAWINGS

The invention is represented in the drawings and is described and explained in more detail by means of specific embodiments.

DETAILED DESCRIPTION OF THE PREFERRED EMBODIMENTS

Figure 1:
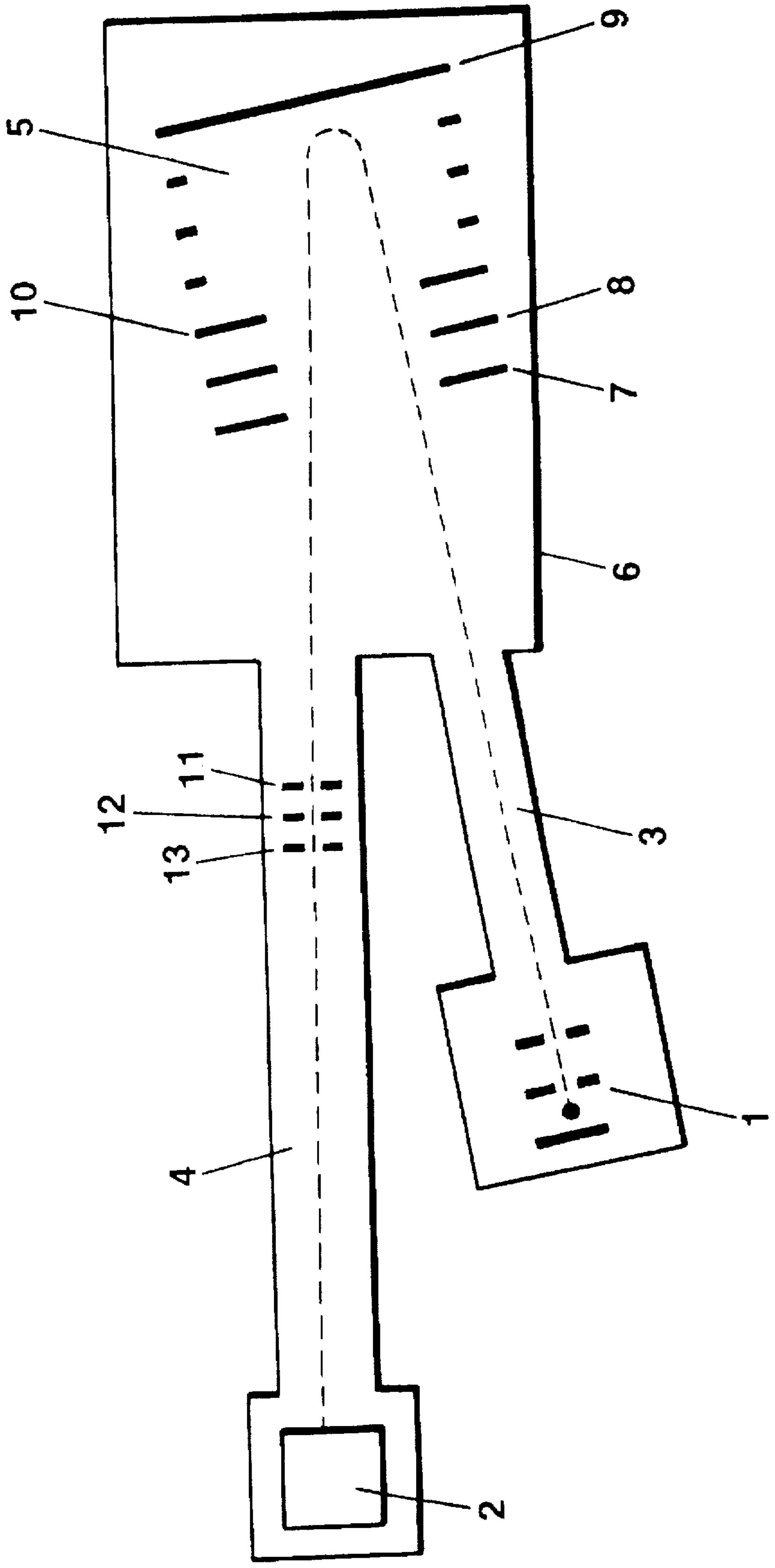
FIG. 1 is a schematic representation of a time-of-flight mass spectrometer according to the invention.

The time-of-flight mass spectrometer schematically represented in FIG. 1, comprises an ion source 1 and an ion detector 2, which are connected by two partial paths 3 and 4 of an ion flight path which join at an acute angle. In the region of the point of intersection of both partial paths 3 and 4, an ion reflector 5 is located. All constructional components are housed within an evacuable case 6. Ion reflector 5 comprises two retarding electrodes 7, 8 located at the ion reflector 5 entrance. The front retarding electrode 7 limits the sections of the partial paths 3, 4 where the electric field generated by the ion reflector 5 comprises a gradient. Between the retarding electrodes, there is an electric field which strongly decelerates the ions, prior to entering the actual reflection path which is between the back retarding electrode 8 and a reflector electrode 9. In addition, between the back retarding electrode 8 and the reflector electrode 9 them is located a focusing electrode 10 effecting the generation of an inhomogeneous electric field which represents an electrostatic lens for the geometric focusing of the ion beam onto detector 2.

According to the invention, there are three electrodes 11, 12, 13 located on the partial path 4 of the ion flight path, which can be used to decelerate or post-accelerate ions of equal mass within a predetermined narrow ion mass range by the application of suitable pulsed high voltages, such that time-of-flight errors due to different locations or times of formation of the ions in the ion source 1 am compensated for at the ion detector 2. In the example shown, electrode 11 is at a higher potential than electrode 12 and electrode 13 is kept at the potential of the casing, in general earth potential. The position of electrodes 11 to 13 between ion reflector 5 and ion detector 2 can actually be chosen arbitrarily. However, in order to achieve an "equalizing" of the ions of equal masses by the high voltage pulse applied to electrodes 11 to 13, which is as good as possible, the field-free flight distance after the region with the pulsed high voltage to the ion detector 2 should be as long as possible. Therefore it is recommended to shift electrodes 11 to 13 close to the ion reflector 5.

Figure 2:
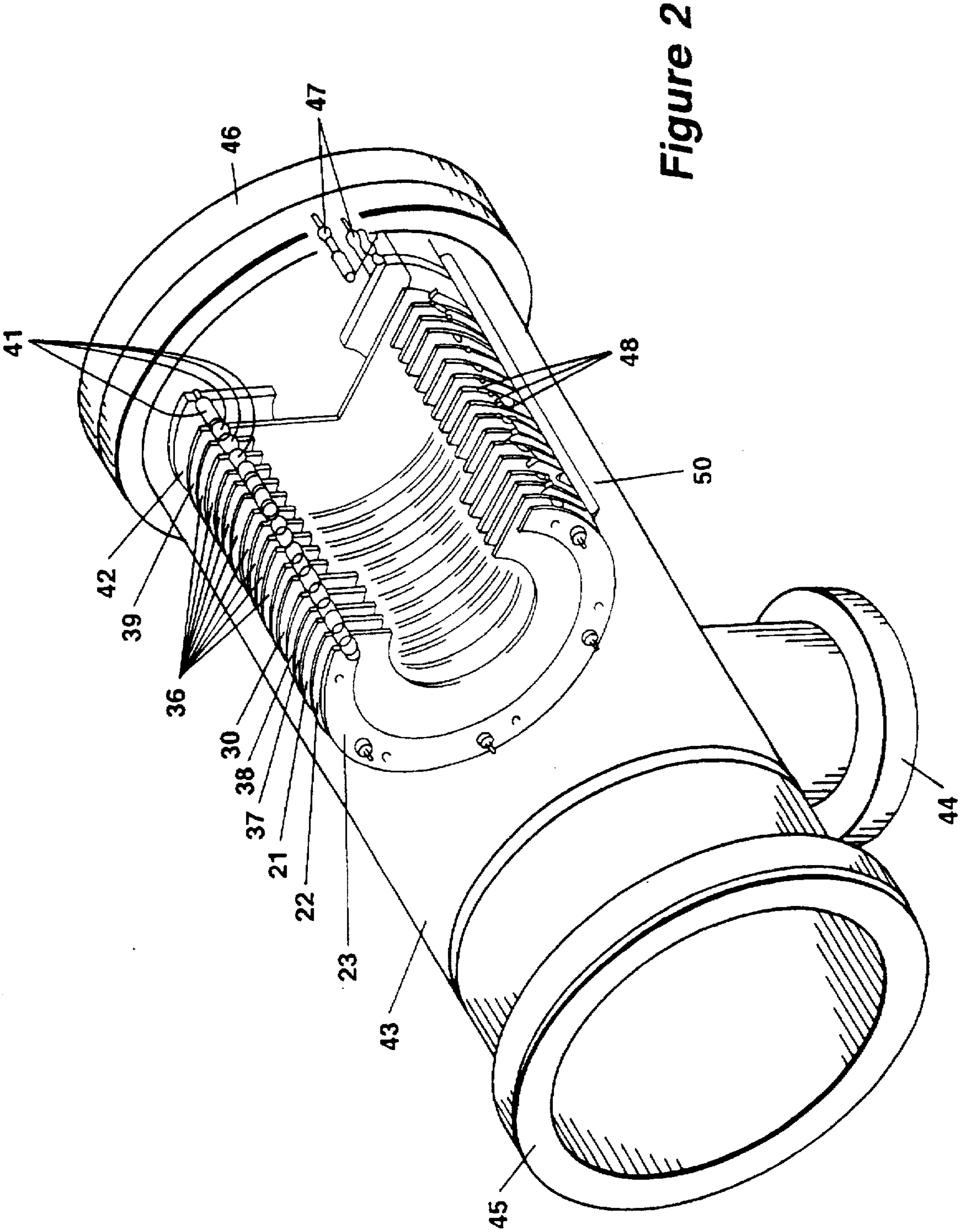
FIG. 2 is a schematic perspective, partly cut, representation of an ion reflector with integrated electrodes for pulsed high voltage.

In particular, in embodiments of the invention, the electrodes with the pulsed high voltage can be an integral component of the ion reflector itself. The mechanical set-up of such a configuration is represented in FIG. 2. In this embodiment, the ion reflector 50 comprises electrodes 21, 22 and 23 for the generation of a pulsed high voltage field, wherein electrode 21 is connected to a higher pulsed potential than electrode 22 and electrode 23 is at the potential of the casing. The remaining electrodes 30 through 39 serve to establish a reflection field, as generated in a state of the art ion reflector. Electrodes 37, 38 and 30 correspond with respect to their function to electrodes 7, 8 and 10, whereas reflector end electrode 39 corresponds to electrode 9 in FIG. 1.

All electrodes are configured in the form of ring apertures which are mounted to a support plate 42 by means of short ceramic tubes 41. Support plate 42 with the electrode system is located inside a vacuum container 43, comprising a connection piece 44 to connect a vacuum pump and a flange 45 to connect the casing to the remaining components of the time-of-flight mass spectrometer. At its end opposite to flange 45, vacuum container 43 comprises a support flange 46 carrying support plate 41 with the electrode system and comprising vacuum feedthroughs 47, allowing the application of defined potentials to the electrodes. More precisely, vacuum feedthroughs 47 serve to apply voltages to a voltage divider formed by resistors 48, each of which connects two of the neighboring electrodes 30 through 39. Correspondingly, electrodes 21 to 23, which are used to generate a pulse-shaped (i.e. very short duration) high voltage field, are separated by resistors in the form of a voltage divider, so that merely one connection for the pulsed high voltage potential has to be guided to electrode 21, whereas electrode 23 is kept at the potential of the vacuum container 43.

Figure 3A:
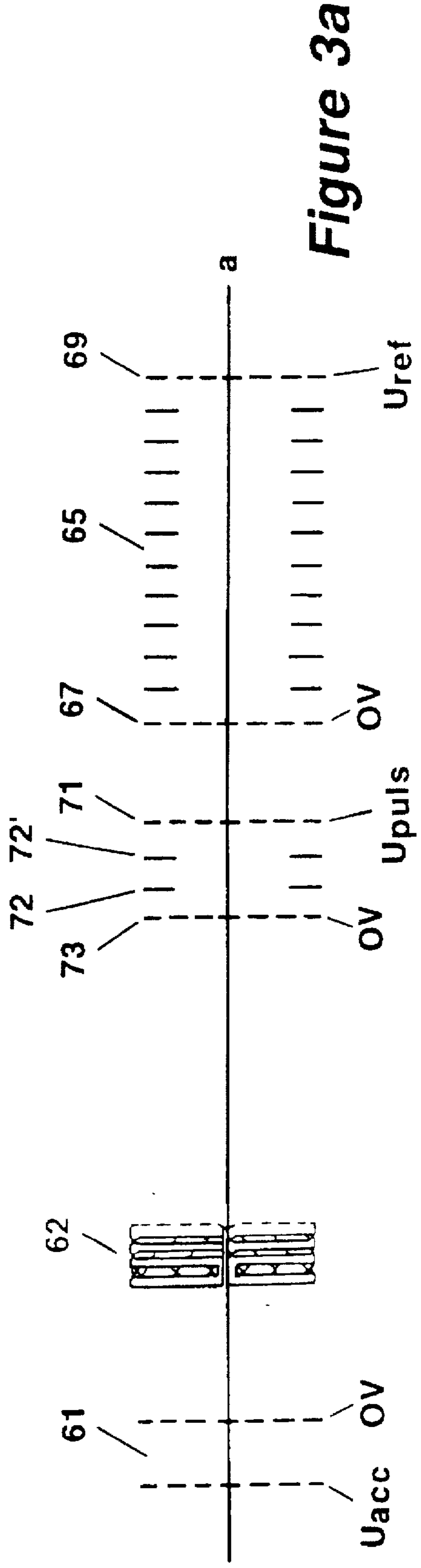
FIG. 3a is a schematic representation of a co-linear reflecting time-of-flight mass spectrometer with high voltage pulse electrodes between ion reflector and ion detector.

FIG. 3*a* shows schematically the configuration of a co-linear time-of-flight mass spectrometer where in the vicinity of the ion source 61 a reflector detector 62 is located coaxially on the connecting axis a between an ion source 61 and an ion reflector 65. In addition, also on the ion beam axis a, an aperture configuration 71, 72, 72' and 73 is provided for in the vicinity of the ion reflector 65 where, analogously to the aperture configuration 11, 12 and 13 of FIG. 1, a pulsed deceleration or post-acceleration field, respectively, can be generated.

In the ion source, at first an ion cloud is generated in a pulse-shaped manner (i.e. minimal temporal separation), flying through a central bore of reflector detector 62 on the ion beam axis a and through apertures 71 to 73. At this point in time, no voltages are applied to apertures 71 to 73. The ion cloud then travels to the ion reflector 65 where it is retro-reflected along the ion beam axis a by a potential $U_{ref}$ at the reflector end plate or a corresponding grid electrode 69. It leaves ion reflector 65 at an aperture 67 which can also be in the form of a grid electrode and which is kept at casing potential (0 V). After this, the ion cloud enters the region of the high voltage pulse electrodes 71 to 73, whereby a pulse-shaped high voltage potential $U_{puls}$ is applied to electrode 71, while electrode 73 is kept at earth potential (surrounding casing). The electrodes 72, 72' in between are connected to their neighboring electrodes by appropriate resistors and serve to linearize and shape, respectively, the pulse-shaped high voltage field between electrodes 71 and 73.

By an appropriate pulse timing, in a predetermined mass range, ion of equal masses of the arriving ion pulse at the front end of the pulse are decelerated and at the end of the pulse relatively post-accelerated, so that ions of equal masses within the narrow mass range, which at first were spatially separated by time-of-flight errors, meet again in the reflector detector 62 and are therefore detected simultaneously. Since such an equalizing with simultaneous energy error compensation with the help of the ion reflector is possible only within a mass range of about 10 mass units but not over the entire mass spectrum considered, the modification of a time-of-flight mass spectrometer according to the invention can also be called "MAGNIFYING GLASS" for an improved resolution in a mass range of interest.

Figure 3B:
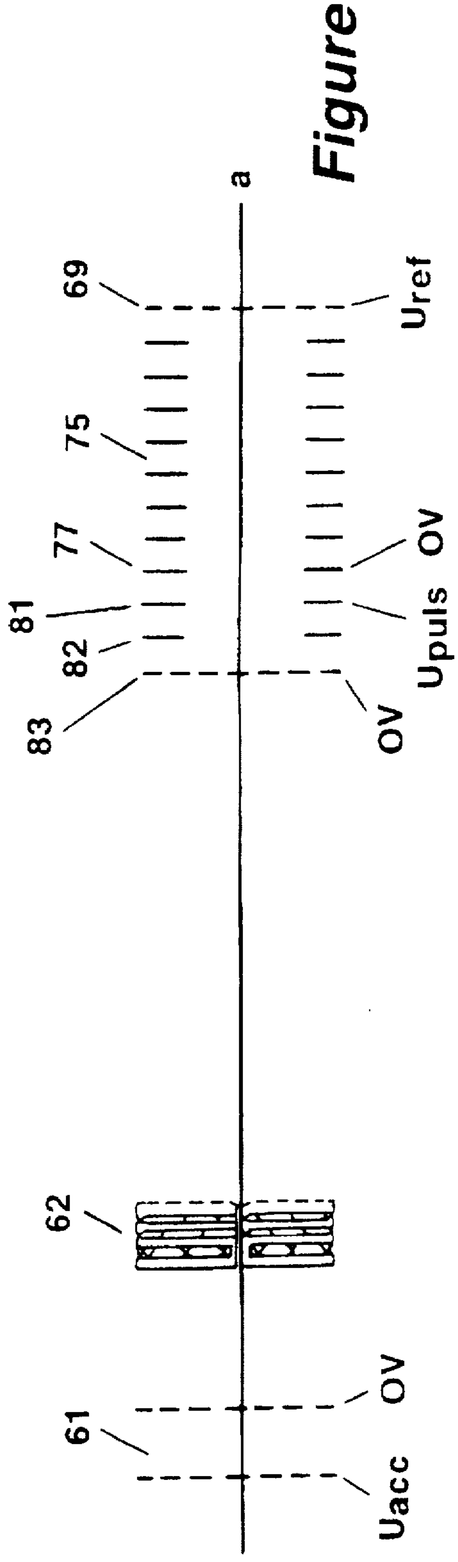
FIG. 3b is as FIG. 3a but with pulsed high voltage electrodes which are integrated into the ion reflector.

FIG. 3*b* also shows a co-linear configuration of he time-of-flight mass spectrometer according to the invention, where, however, electrodes 81, 82 and 83, to which a pulsed high voltage is to be applied, are integrated into an ion reflector 75, similar to the configuration of FIG. 2. In this way, the already very space-saving co-linear configuration becomes even more compact. In FIG. 3*b*, electrode 77, which is arranged at casing potential inside the ion reflector 75 now corresponds to the exit electrode 67 of FIG. 3*a*.

Figure 4:
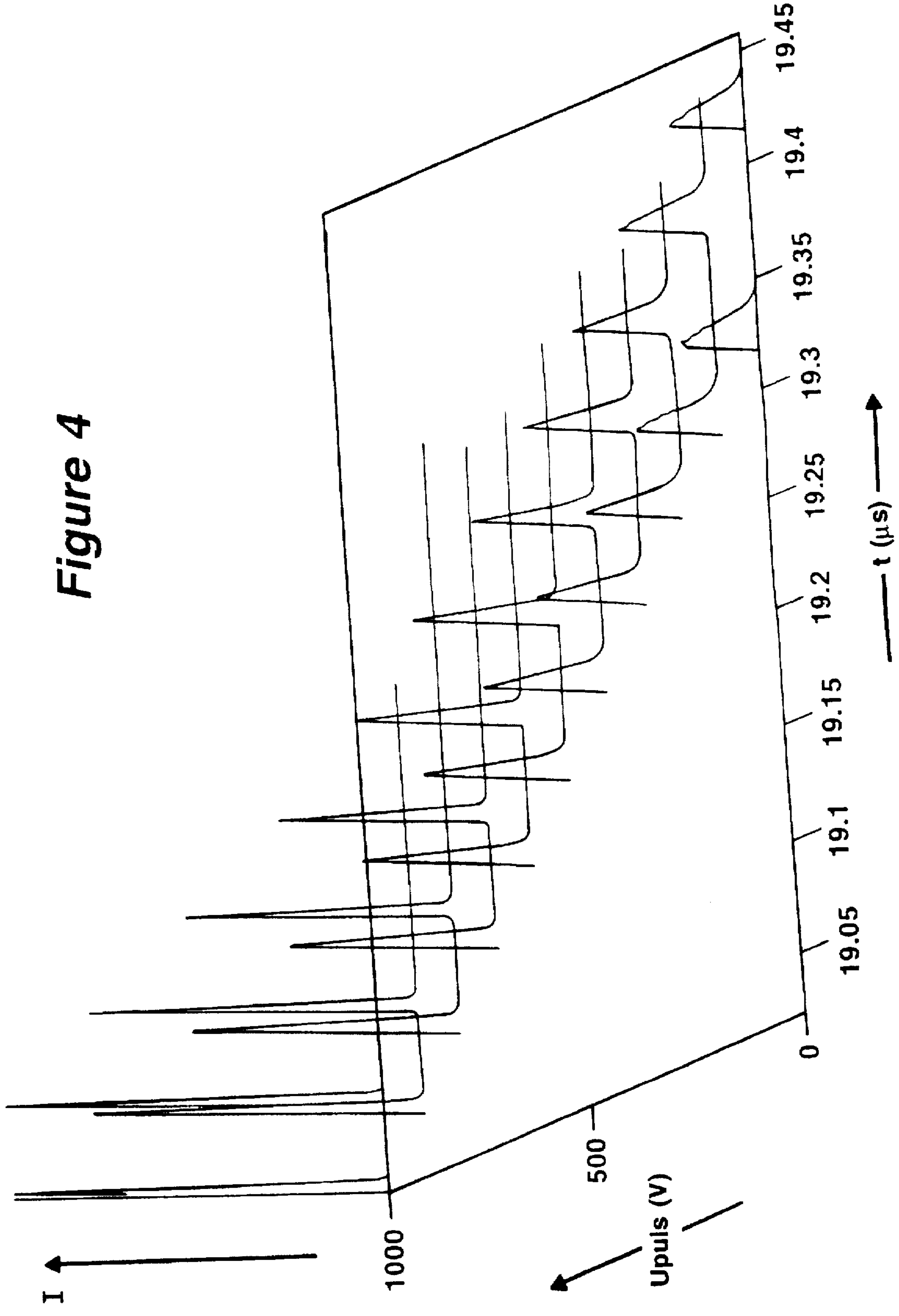
FIG. 4 is a mass spectra of masses 100 and 101 for different pulsed high voltages.

FIG. 4 shows a first example for the considerably improved resolution in the time-of-flight mass spectrometer according to the invention, whereby in the representation the relative intensities of the ion current as measured at the ion detector are displayed vertically, to the right the measured times-of-flight t, and in the plane of projection at right angles thereto the respective pulsed potentials $U_{puls}$. The respectively left peak corresponds to a mass of 100 mass units, whereas the respectively right peak corresponds to an ion mass of 101 mass units. As can be seen, for increasing potential the measured signal intensity becomes larger whereas the corresponding times-of-flight of both masses move towards each other only relatively little, so that altogether the mass resolution is considerably improved.

Figure 5:
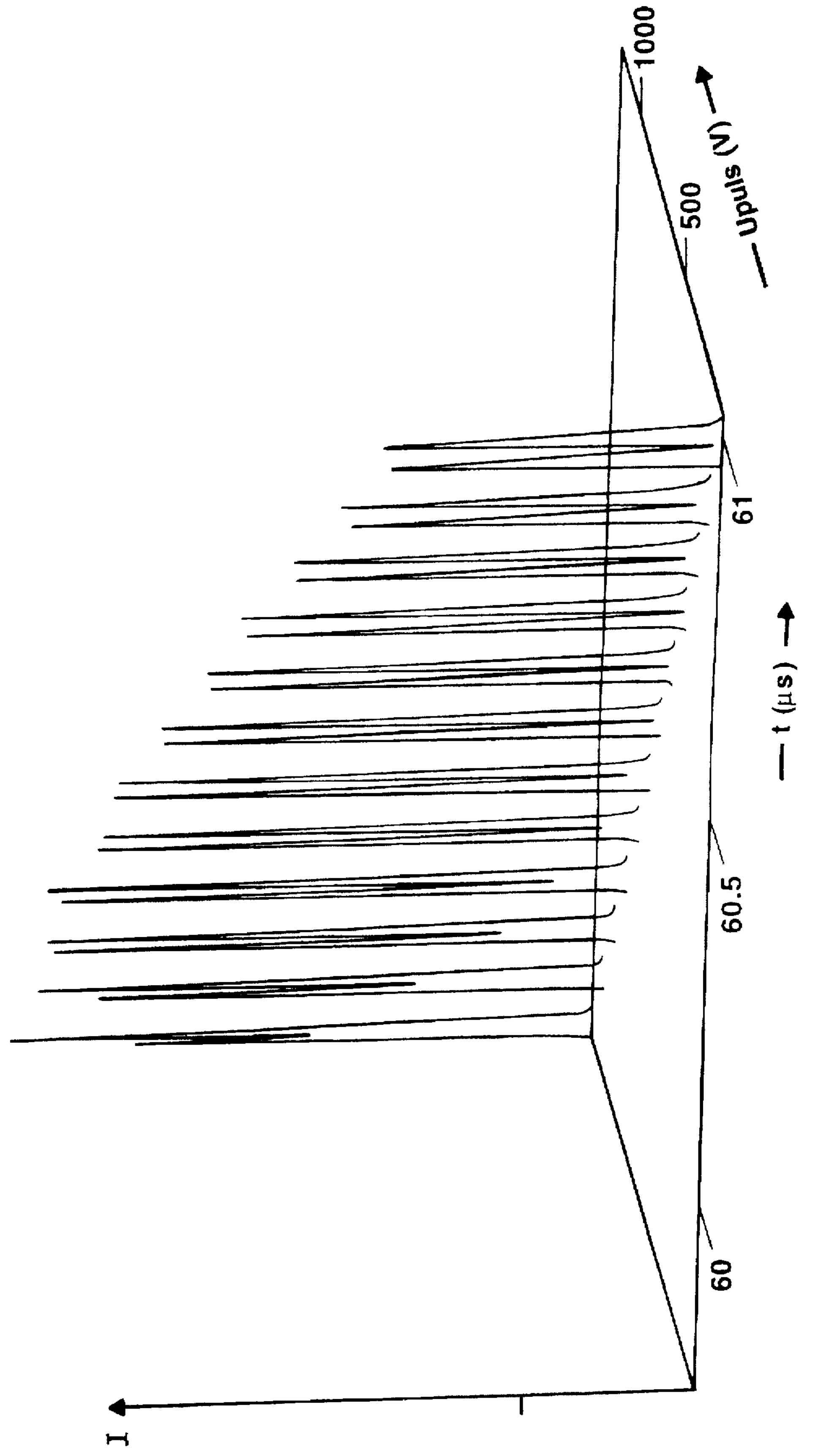
FIG. 5 is a mass spectra of masses 1000 and 1001 for different pulsed high voltages.

A similar representation as in FIG. 4 is shown in FIG. 5 with the example of masses 1000 (left) and 1001 (right). Here, however, optimum resolution should be reached for a potential $U_{puls}$ of about 500 V, whereas for higher pulse voltages the two mass peaks approach each other to such an extent that eventually possibly only one peak appears, so that the spectrometer resolution would worsen again for a further increase of the high voltage potential $U_{puls}$.

Figure 6:
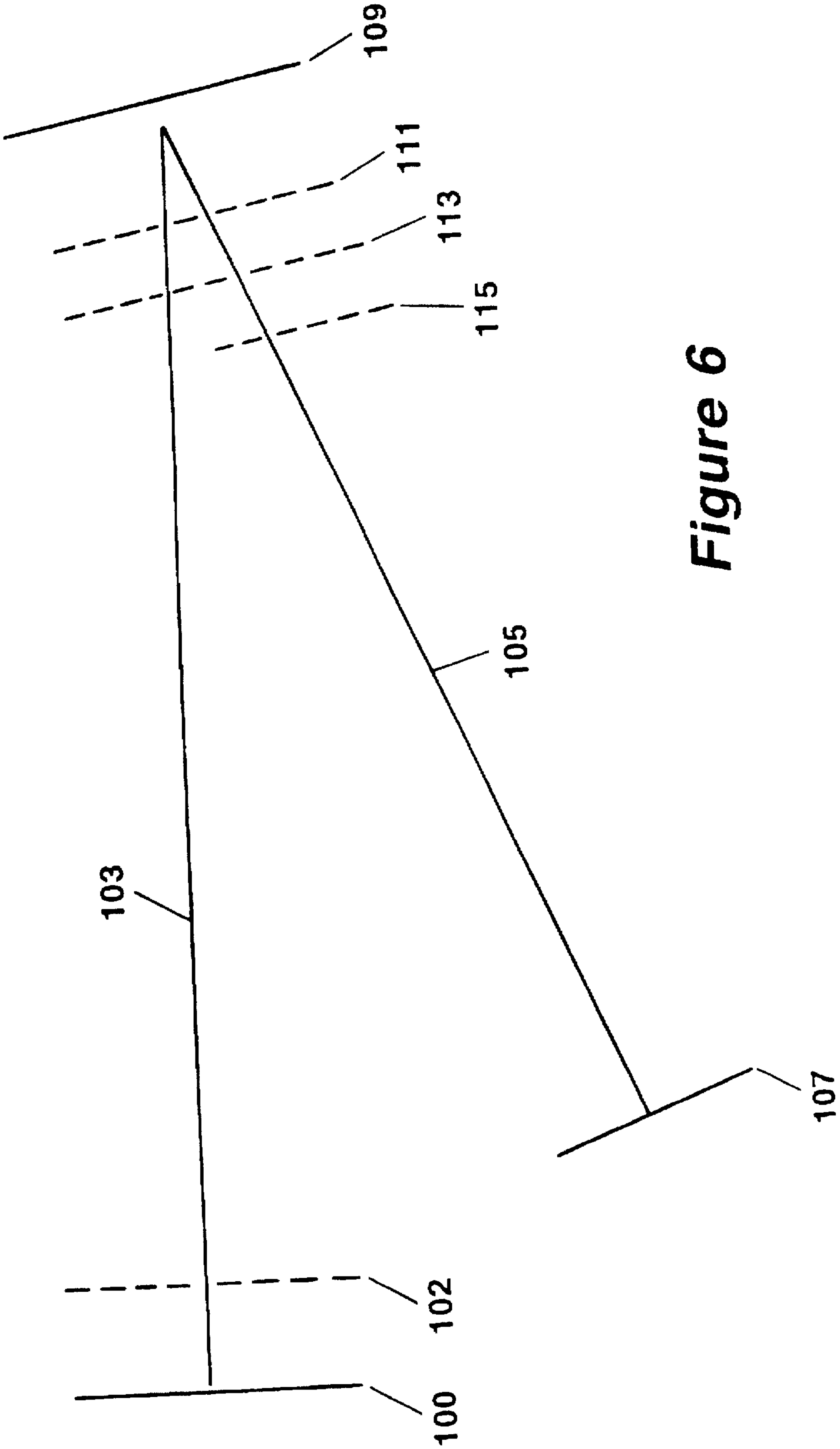
FIG. 6 is a schematic depiction corresponding to an example of the present invention.

The invention can be demonstrated by the following example, which makes reference to the schematic drawing of FIG. 6.

In the example of FIG. 6, a mass of 2466.7 amu (atomic mass units) is ionized by a MALDI process to give a mean initial velocity of 1000 m/s and a velocity distribution of ±500 m/s. The ion source of FIG. 6 is made up of electrodes 100, 102 which are separated by 15 mm, and which have a relative potential difference of 10,000 V to accelerate the ions. The primary drift region 103 (between the ion source and the reflector) is 892 mm, and the secondary drift region 105 (between the reflector and the ion detector 107) is 446 mm.

A first reflector field in FIG. 6 is created by electrode 109, at a potential of 10,500V and electrode 111, at a potential of about 7,350 V. These electrodes are separated by 234 mm. A second reflector field is created between electrode 111 and electrode 113, which is normally at a potential of 0 V. These electrodes are separated by 10 mm. Without the use of the present invention, the total time of flight of the ion (including the time within the ion source, the reflector and the two drift regions) is 114.21 μs with a Δt of 73 ns. This provides a resolution of about R=780 at full-width half-maximum (FWHM).

The pulsed high voltage of the present invention is applied to a post-reflection region between electrode 113 and electrode 115, which has a potential of 0V. The separation between electrode 113 and electrode 115 is 30 mm. During most of the flight of the ions, both of these electrodes are at 0V. However, at a time of 97.727 μs after the laser pulse, a voltage of 680 V is applied to electrode 113. At this time, the desired ions have been reflected by the reflector and are near the center of the post-reflection region. This narrow width pulse focuses the ions onto the detector 107. Experimental data shows that resolution for the ions of interest is thereby improved to about R=8000 (FWHM).

We claim:

1. A time-of-flight mass spectrometer with an ion source, an ion flight path and an ion detector at the end of the ion flight path wherein, in the ion flight path, after the ion source and before the ion detector, an ion reflector is placed to compensate for different starting energies of ions of equal masses, the spectrometer comprising:

at least one electrode inside or after the ion reflector, relative to the flight path, to which a pulsed high voltage is applied in such a way that within a predetermined narrow range of ion masses, time-of-flight errors for ions of equal masses due to different formation locations or times in the ion source are compensated for at the ion detector.

2. A time-of-flight mass spectrometer according to claim 1 wherein the fraction of the ion flight path between the ion source and the electrode with pulsed high voltage is smaller or equal to the fraction of the ion flight path between the electrodes with pulsed high voltage and ion detector.

3. A time-of-flight mass spectrometer according to claim 2 wherein the electrode with pulsed high voltage has a considerably smaller distance to the ion reflector than to the ion detector.

4. A time-of-flight mass spectrometer according to claim 3 wherein the electrodes with pulsed high voltage is an integral part of the ion reflector.

5. A time-of-flight mass spectrometer according to claim 4 wherein the ion flight path inside the ion reflector is retro-reflected and the ion detector is located along a connecting line from the ion source to ion reflector.

6. A time-of-flight mass spectrometer according to claim 4 wherein the electrode is one of a plurality of neighboring electrodes with pulsed high voltage which are electrically connected by resistors of a voltage divider which determines the electrode potentials of the respective electrodes.

7. A time-of-flight mass spectrometer according to claim 2 wherein the ion flight path inside the ion reflector is retro-reflected and the ion detector is located along a connecting line from the ion source to ion reflector.

8. A time-of-flight mass spectrometer according to claim 2 wherein the electrode is one of a plurality of neighboring electrodes with pulsed high voltage which are electrically connected by resistors of a voltage divider which determines the electrode potentials of the respective electrodes.

9. A time-of-flight mass spectrometer according to claim 1 wherein the electrode with pulsed high voltage has a considerably smaller distance to the ion reflector than to the ion detector.

10. A time-of-flight mass spectrometer according to claim 9 wherein the ion flight path inside the ion reflector is retro-reflected and the ion detector is located along a connecting line from the ion source to ion reflector.

11. A time-of-flight mass spectrometer according to claim 9 wherein the electrode is one of a plurality of neighboring electrodes with pulsed high voltage which are electrically connected by resistors of a voltage divider which determines the electrode potentials of the respective electrodes.

12. A time-of-flight mass spectrometer according to claim 1 wherein the ion flight path inside the ion reflector is retro-reflected and the ion detector is located along a connecting line from the ion source to ion reflector.

13. A time-of-flight mass spectrometer according to claim 12 wherein the ion detector is located between the ion source and the ion reflector at a small distance from the ion source and comprises on its axis a central recess.

14. A time-of-flight mass spectrometer according to claim 12 wherein the electrode is one of a plurality of neighboring electrodes with pulsed high voltage which are electrically connected by resistors of a voltage divider which determines the electrode potentials of the respective electrodes.

15. A time-of-flight mass spectrometer according to claim 1 wherein the electrode is one of a plurality of neighboring electrodes with pulsed high voltage which are electrically connected by resistors of a voltage divider which determines the electrode potentials of the respective electrodes.

16. A method of operating a time-of-flight mass spectrometer in which ions are formed by an ion source, accelerated on an ion flight path and reflected in an ion reflector having an ion reflector end electrode in such a way that different starting energies of ions of equal masses are compensated for, the method comprising:

providing at least one electrode which is after the reflector relative to a flight path of the ions;

compensating for time-of-flight errors due to different locations of formation or formation times of ions in the ion source in a predetermined narrow ion mass range by applying a pulsed high voltage to said at least one electrode after reflection of the ions in the ion reflector.

17. A method according to claim 16 wherein the pulsed high voltage is a very short duration high voltage.

18. A method according to claim 17 wherein the high voltage is a minimum of 1 kV with a pulse duration of no more than 10 ns.

19. A method according to claim 17 wherein the ion masses of the ions to be investigated are in a range of 100 to 10,000 atomic mass units and the mass window defining the predetermined narrow ion mass range is about 10% of the highest mass unit.

20. A method according to claim 16 wherein the ion masses of the ions to be investigated are in a range of 100 to 10,000 atomic mass units and the mass window defining the predetermined narrow ion mass range is about 10% of the highest mass unit.

21. A method according to claim 16 wherein a voltage at the ion reflector end electrode is changed by an amount equal to the pulsed high voltage during the application of the pulsed high voltage.

* * * * *